(12) United States Patent
Kurihara et al.

(10) Patent No.: US 8,597,465 B2
(45) Date of Patent: Dec. 3, 2013

(54) PAPER AND PAPER PRODUCTION METHOD

(75) Inventors: Eizo Kurihara, Kanagawa (JP);
Katsumi Sakamaki, Kanagawa (JP);
Mario Fuse, Kanagawa (JP); Shoji Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/452,116

(22) Filed: Apr. 20, 2012

(65) Prior Publication Data

US 2013/0139982 A1    Jun. 6, 2013

(30) Foreign Application Priority Data

Dec. 6, 2011    (JP) .................. 2011-267195

(51) Int. Cl.
*D21H 27/32*    (2006.01)

(52) U.S. Cl.
USPC ........... 162/138; 162/124; 162/140; 428/457; 428/464; 428/537.5; 428/608; 428/689; 428/692.1; 428/693.1

(58) Field of Classification Search
None
See application file for complete search history.

(56) References Cited

U.S. PATENT DOCUMENTS

| | | | |
|---|---|---|---|
| 2005/0040641 A1* | 2/2005 | Cote et al. | 283/72 |
| 2005/0255309 A1* | 11/2005 | Taylor et al. | 428/323 |
| 2008/0018674 A1* | 1/2008 | Matsuda et al. | 346/74.4 |
| 2010/0167082 A1* | 7/2010 | Oh | 428/608 |

FOREIGN PATENT DOCUMENTS

| | | |
|---|---|---|
| EP | 0 753 623 A2 * | 1/1997 |
| JP | A-2001-264505 | 9/2001 |
| JP | A-2003-340983 | 12/2003 |
| JP | 2005-146477 * | 6/2005 |

* cited by examiner

*Primary Examiner* — Richard Crispino
*Assistant Examiner* — Eric Yaary
(74) *Attorney, Agent, or Firm* — Oliff & Berridge, PLC

(57) ABSTRACT

A paper includes a paper body containing pulp fibers, a low electric-resistance region provided in a layer inside the paper body and being lower than the paper body in electric resistivity, and magnetic bodies arranged inside the low electric-resistance region and having a large Barkhausen effect.

6 Claims, 8 Drawing Sheets

PAPER AND PAPER PRODUCTION METHOD

CROSS-REFERENCE TO RELATED APPLICATIONS

This application is based on and claims priority under 35 USC 119 from Japanese Patent Application No. 2011-267195 filed Dec. 6, 2011.

BACKGROUND

Technical Field

The present invention relates to a paper and a paper production method.

SUMMARY

According to an aspect of the invention, there is provided a paper including: a paper body containing pulp fibers; a low electric-resistance region provided in a layer inside the paper body and being lower than the paper body in electric resistivity; and magnetic bodies arranged inside the low electric-resistance region and having a large Barkhausen effect.

BRIEF DESCRIPTION OF THE DRAWINGS

Exemplary embodiments of the present invention will be described in detail based on the following figures, wherein.

DETAILED DESCRIPTION

Figure 1:
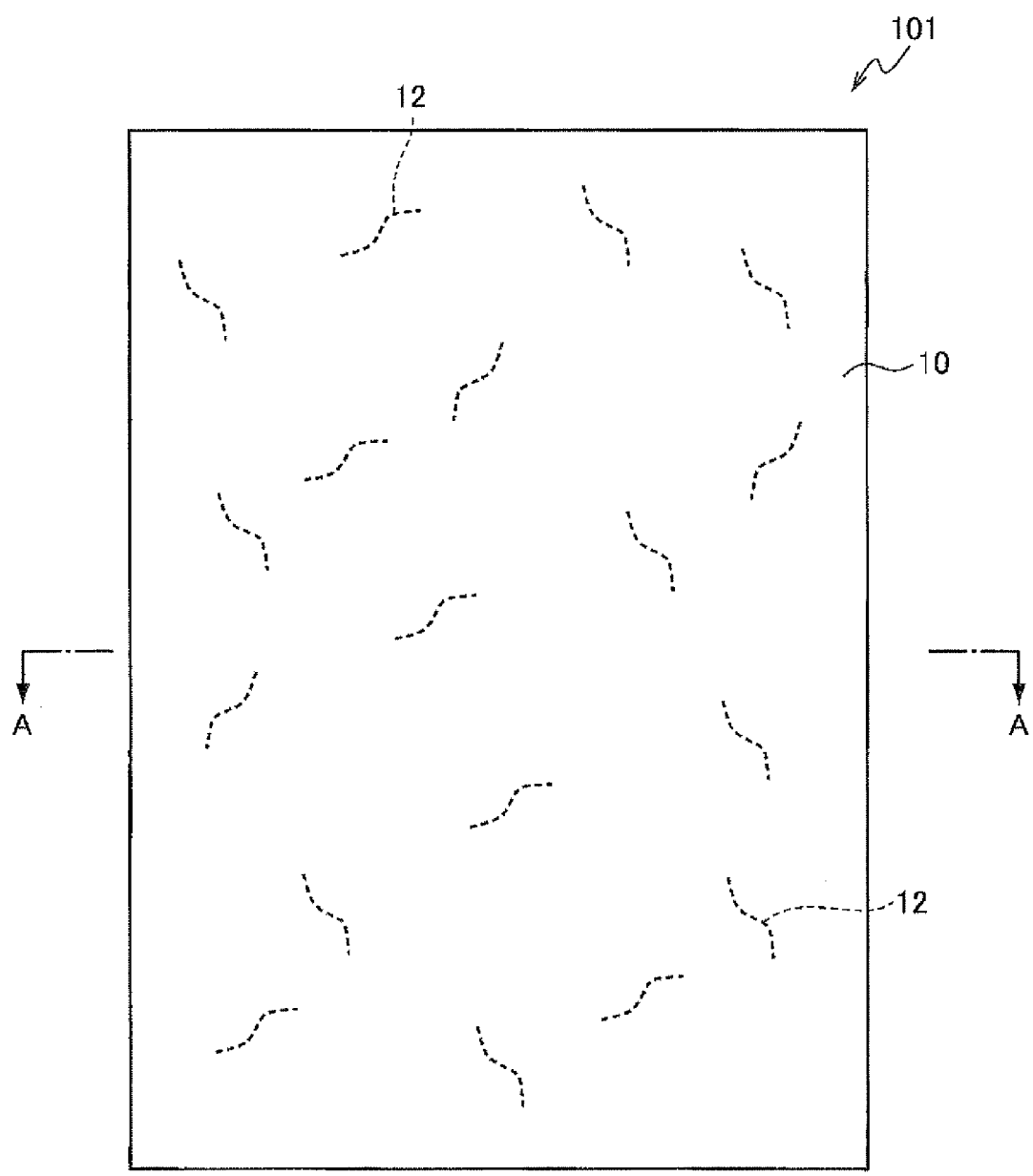
FIG. 1 is a plan view showing a sheet of paper related to a first exemplary embodiment.

Present exemplary embodiments that are examples of the invention will be described below, referring to the drawings. In addition, members that have substantially the same functions are designated by the same signs throughout the drawings, and duplicate description is omitted.

Paper

First Exemplary Embodiment

Figure 2:
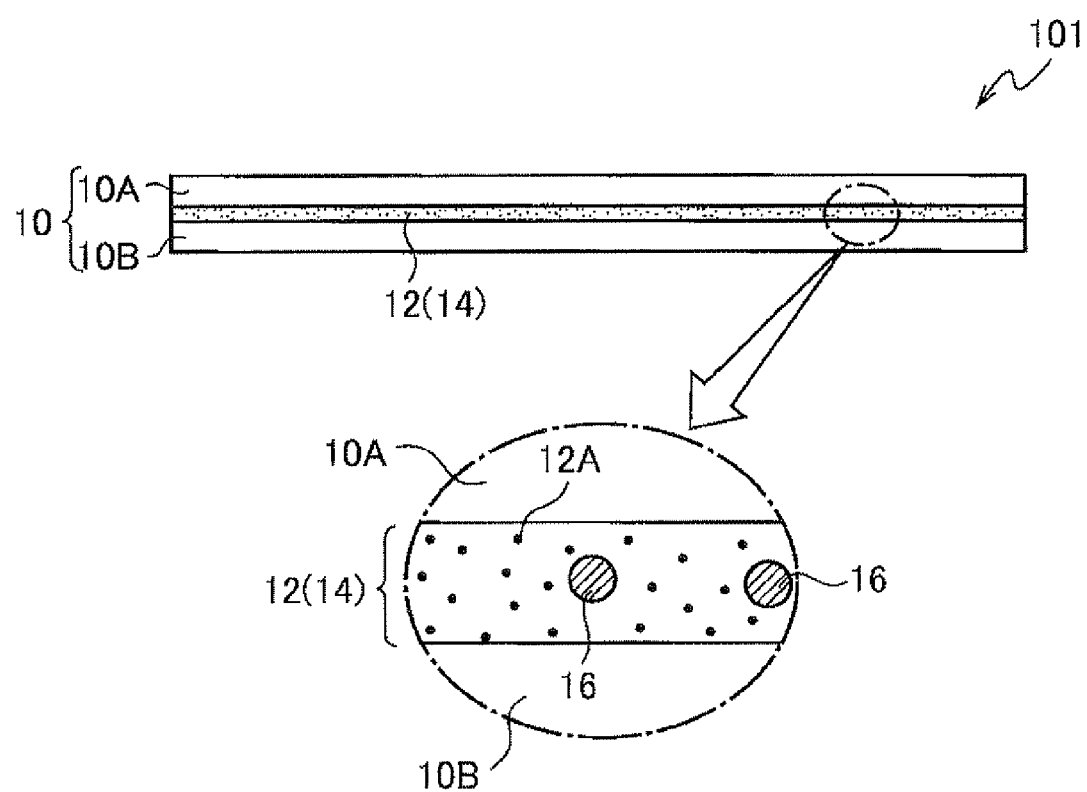
FIG. 2 is a cross-sectional view showing the paper related to the first exemplary embodiment.

FIG. 1 is a plan view showing a sheet of paper related to a first exemplary embodiment. FIG. 2 is a cross-sectional view showing the paper related to the first exemplary embodiment. FIG. 2 is a sectional view taken along line A-A of FIG. 1.

The paper 101 related to the first exemplary embodiment, as shown in FIGS. 1 and 2, has a paper body 10 containing pulp fibers, the low electric-resistance region 12 provided in a layer inside the paper body 10 and being lower than the paper body in electric resistivity, and magnetic bodies 16 arranged inside the low electric-resistance region 12 and having a large Barkhausen effect.

The paper body 10 is constituted by, for example, a first paper layer 10A and a second paper layer 10B. As the low electric-resistance region 12, for example, a conductive layer 14 containing a conductive material is provided so as to be interposed in a layer between the first paper layer 10A and the second paper layer 10B.

That is, in the paper 101 related to a first exemplary embodiment, the conductive layer 14 being lower than the first paper layer 10A and the second paper layer 10B in electric resistivity is independently provided between the first paper layer 10A and the second paper layer 10B, and the magnetic bodies 16 are arranged inside the conductive layer 14.

Second Exemplary Embodiment

Figure 3:
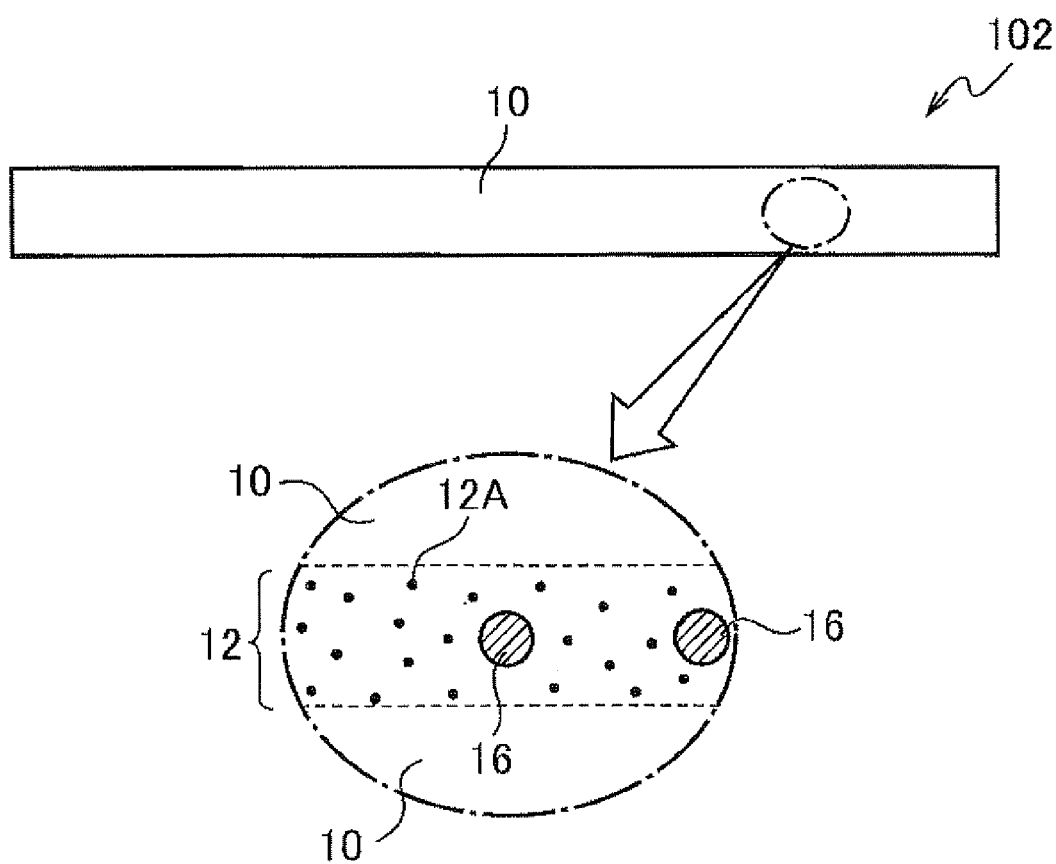
FIG. 3 is a cross-sectional view showing a sheet of paper related to a second exemplary embodiment.

FIG. 3 is a cross-sectional view showing a sheet of paper related to the second exemplary embodiment. In addition, FIG. 3 is a view equivalent to the sectional view taken along line A-A of FIG. 1.

In a sheet of paper 102 related to the second exemplary embodiment, as shown in FIG. 3, a low electric-resistance region 12 being lower than a paper body in electric resistivity is provided inside one paper body 10, and a low electric-resistance region 12 is constituted by a region where a conductive material 12A is dispersed inside the paper body 10.

That is, in the paper 102 related to the second exemplary embodiment, the conductive material 12A is included so as to be dispersed inside one paper body 10 in a planar direction (direction intersecting a normal line of a plane) of the paper body 10, and a layered region (region being lower than other regions in electric resistance) that does not have a clear interface inside the paper body 10 is formed as the low electric-resistance region 12.

Magnetic bodies 16 having a large Barkhausen effect are arranged inside the low electric-resistance region 12.

Working Effects

Here, in the related art, in order to detect a sheet of paper utilizing a largeBarkhausen effect that a magnetic body has, arranging the magnetic body inside the paper is performed.

However, in the paper having the magnetic body arranged therein, the electric resistance around a region where the magnetic body is arranged drops compared to other regions. Therefore, if image recording is performed on the paper utilizing the electrophotographic image recording of transferring an image electrostatically and recording an image, poor transfer is apt to occur around the magnetic body where electric resistance drops partially.

Thus, in the sheets of paper 101 and 102 related to the first and second exemplary embodiments, the low electric-resistance region 12 being lower than the paper body 10 in electric resistivity is provided inside the paper body 10, and the magnetic bodies 16 are arranged inside the low electric-resistance region 12.

By arranging the magnetic bodies 16 inside the low electric-resistance region 12, a difference in electric resistance between the perimeter of a region where the magnetic bodies 16 in which electric resistance drops are arranged and other regions becomes small.

For this reason, in the sheets of paper 101 and 102 related to the first and second exemplary embodiments, the degree that the electric resistance of a region (region around the magnetic bodies 16) whose electric resistance becomes smaller partially drops is relieved in all the planar directions of each sheet of paper. Therefore, a height difference in electric resistance becomes smaller. As a result, it is believed that poor transfer of an image by the electrophotographic image recording is suppressed.

Particularly in the paper 101 related to the first exemplary embodiment, since it is easy to change the types of paper (high-quality paper, coated paper, colored paper, and the like)

to be used for the first paper bodies 10A and 10B and basis weight, there is an advantage that flexibility is high.

Additionally, in the paper 102 related to the second exemplary embodiment, the low electric-resistance region is provided inside one paper body. Therefore, there is an advantage that paper thickness becomes smaller than that of the paper 101.

Respective Elements

The respective elements of the sheets of paper 101 and 102 related to the first and second exemplary embodiments will be described below in detail.

Paper Body 10, First Paper Layer 10A, and Second Paper Layer 10B

The paper body 10, the first paper layer 10A, and the second paper layer 10B includes pulp fibers, and if needed, other additives such as a filler.

The pulp fibers will be described.

Examples of the pulp fibers include well-known pulp fibers.

Specific examples of the pulp fibers include wood pulp fibers (for example, hardwood bleached craft pulp fibers, hardwood unbleached craft pulp fibers, softwood bleached craft pulp fibers, softwood unbleached craft pulp fibers, hardwood bleached sulfite pulp fibers, hardwood unbleached sulfite pulp fibers, softwood bleached sulfite pulp fibers, and softwood unbleached sulfite pulp fibers), non-wood pulp fibers (for example, cotton pulp fibers, hemp pulp fibers, straw (for example, rice straw, wheat straw) pulp fibers, bamboo pulp fibers, reed pulp fibers, kenaf pulp fibers, and bagasse pulp fibers).

Specific examples of the pulp fibers includes ground wood pulp fibers formed by mechanically pulping woods or chips, chemimechanical pulp fibers formed by impregnating woods or chips with chemicals and then mechanically pulping them, thermomechanical pulp fibers formed by pulping chips by a refiner after digesting the chips to a somewhat softened state, and the like.

The pulp fibers may be used singly or may be used in combinations of two or more thereof.

Among them, softwood pulp fibers (for example, softwood bleached craft pulp fibers, softwood unbleached craft pulp fibers, softwood bleached sulfite pulp fibers, and softwood unbleached sulfite pulp fibers), and non-wood pulp fibers are preferable. Compared to the other pulp fibers, these softwood pulp fibers and nonwood pulp fibers tend to have long fiber length, are apt to be entangled in the magnetic bodies 16, and particularly become apt to suppress exposure to the front and back faces of the magnetic bodies 16.

Here, the content of at least one selected from the softwood pulp fibers and the nonwood pulp fibers may be from 1% by weight to 100% by weight (preferably from 5% by weight to 80% by weight) to the total pulp fibers.

These pulp fibers may be prepared only from virgin pulp fibers or combined with waste paper pulp fibers if needed.

In particular, if the virgin pulp fibers are used, the virgin pulp fibers may be bleached by a bleaching method (Elementally Chlorine Free: ECF) of using only chlorine dioxide without using chlorine gas or by a bleaching method (Total Chlorine Free: TCF) of using mainly ozone/hydrogen peroxide or the like without using a chlorine compound at all.

Additionally, raw materials for the waste paper pulp fibers include unprinted waste papers of extremely high-quality, high-quality, medium-grade white, low-grade, and other white papers that are cut, damaged, and irregular in size generated in bookmakers, printshops, cutting facilities, and the like; high-quality print waste papers such as woodfree and coated woodfree papers that are printed or copied; waste papers printed with inks such as aqueous and oil-based inks or with lead pencils; newspaper waste papers containing advertising leaflets of printed woodfree papers, woodfree coated paper, wood-containing paper, or wood-containing coated paper; and waste papers of wood-containing papers, coated wood-containing papers, wood papers, and the like.

As the waste paper pulp fibers, pulp fibers obtained by bleaching a raw waste paper by at least one of an ozone bleaching treatment and a hydrogen peroxide bleaching treatment. Additionally, in order to obtain a base paper with a higher degree of whiteness, the blending ratio of the waste paper pulps obtained by the bleaching treatment is preferably within a range of from 50% by weight to 100% by weight. Moreover, from a viewpoint of resource recycling, the blending ratio of the waste paper pulps is preferably within a range of from 70% by weight to 100% by weight.

Next, the other additives such as a filler will be described.

Examples of the filler include white inorganic pigments such as heavy calcium carbonate, light calcium carbonate, chalk, kaolin, claimed clay, talc, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, calcium montmorillonite, sodium montmorillonite, and bentonite; organic pigments such as acrylic plastic pigments, polyethylene, urea resins, and the like. Additionally, if waste paper is blended, the additive amount of the filler may be adjusted by previously estimating the ashes contained in the raw waste paper.

An internal sizing agent may be added to the paper body 10, the first paper layer 10A, and the second paper layer 10B. Examples of the internal sizing agent include those used in neutral sheeting processes such as neutral rosin-based sizing agents, alkenylsuccinic anhydrides (ASA), alkylketene dimers (An), petroleum resin-based sizing agents, and the like.

When the surfaces of the paper body 10, the first paper layer 10A, and the second paper layer 10B is adjusted to be cationic, for example, the surfaces may be treated with a hydrophilic cation resin or the like.

In order to suppress penetration of this cationic resin into the paper body 10, the first paper layer 10A and the second paper layer 10B, the sizing degree of the paper before application of the cationic resin may be 10 seconds or more and less than 60 seconds.

A paper-strengthening agent may be internally or externally added to the paper body 10, the first paper layer 10A, and the second paper layer 10B if needed.

Examples of the paper-strengthening agent include starch, modified starches, vegetable gums, carboxymethylcellulose, polyvinylalcohol, polyacrylamide, urea-formaldehyde resins, melamine-formaldehyde resins, dialdehyde starch, polyethyleneimine, epoxidized polyamides, polyamide-epichlorohydrin resins, methylol-modified polyamides, chitosan derivatives, and the like.

Various additives to be blended with common paper medium such as dyes and pH adjusters may be added to the paper body 10, the first paper layer 10A, and the second paper layer 10B.

The total thickness of the paper may be, for example, from 80 µm to 120 µm.

Magnetic Body 16

The magnetic bodies 16 are not particularly limited in its magnetic physical properties, composition, shape, or the like, as long as magnetic bodies made of a magnetic material having features causing a large Barkhausen effect are provided.

However, as the magnetic physical properties of the magnetic bodies 16, the hysteresis loop thereof may be oblong and the coercive force (Hc) may be relatively small.

Examples of the composition of the magnetic bodies 16 include alloys of magnetic elements (for example, Co, Fe, and Ni), and alloys (for example, Co systems, Fe systems, Ni systems, and mixing systems thereof, specifically, Co—B—Si, Co—Fe—B—Si, and the like) containing transition metals and glass-forming elements (for example, Si, B, C, and P). By selecting the composition ratio and production method of the constituent elements, materials having various magnetic characteristics may be used. In addition, the hue of the amorphous alloys of the above elements is not greatly affected by the ratio of these elements.

Although the shape of the magnetic bodies 16 are not particularly limited if the magnetic wire has a shape that is suitable to cause a large Barkhausen effect, a predetermined length is required with respect to the cross-sectional area in order to cause a large Barkhausen effect. Therefore, the shape of the magnetic bodies needs to be linear (wire-shaped).

In addition, the linear shape (wire shape) is a concept including shapes provided such that circular, rectangular, and other shapes as cross-sectional shapes (shapes that are cut along a direction that crosses the longitudinal direction of magnetic bodies 16) extend in the shape of a straight line or in the shape of a curve.

In order for the magnetic bodies 16 to have a large Barkhausen effect, the diameter of the magnetic bodies may be equal to or more than 10 μm.

For this reason, for example, when the magnetic body is contained in a sheet of paper having a thickness from 80 μm to 120 μm, that cross-sectional shape of the magnetic bodies 16 may be circular, and may have an external diameter of from 10 μm to 60 μms (preferably from 15 μm to 55 μm, and more preferably from 15 μm to 35 μm). On the other hand, the length of the magnetic bodies 16 depends on the external diameter. For example, when the external diameter is from 10 μm to 60 μm, the length of the magnetic body may be from 10 μm to 40 μm (preferably 10 mm to 30 mm and more preferably from 15 mm to 25 mm)

The magnetic body is obtained, for example, by melting a magnetic material, passing the molten magnetic material through a discharge port with a shape corresponding to a desired cross-sectional shape, and then cooling the molten magnetic material. Specifically, for example, there are methods such as a production method described in USP3,256,584 (the Taylor-Ulitovsky method), a so-called single-roll method of supplying molten alloy onto one cooling roller that is rotating at high speed to obtain a thin strap, a so-called twin-roll method of supplying molten metal to between one pair of cooling rollers that is rotating at high speed to obtain a thin strap, and the like.

The content of the magnetic bodies 16 may be, for example, from 1 piece to 50 pieces (preferably from 3 pieces to 40 pieces and more preferably from 5 pieces to 30 pieces) per sheet of paper.

Low Electric-Resistance Region 12

The low electric-resistance region 12 includes an aspect in which the conductive layer 14 containing the conductive material 12A is provided and an aspect in which the conductive material 12A is dispersed inside the paper body 10 and a region where the electric resistance drops is provided.

Here, the low electric-resistance region 12 is a region where the electric resistance is lower than that of the paper body 10, the first paper layer 10A, and the second paper layer 10B, specifically, a region that is confirmed by measurement of surface electric resistivity as follows.

Interlayer peeling of a sheet of paper is performed by a splitter, and the surface electric resistivity of the low electric-resistance region 12 and the paper body 10 (or the first paper layer 10A and the second paper layer 10B) that are interlayer-peeling faces is measured. A paper interlayer-peeling method in the splitter passes the splitter so that a short side on which a double-faced tape is stuck becomes a tip after the double-faced tape is pasted on the front and back faces of a tip part of one short side of a sheet of paper of 15×20 cm and a separate paper of the double-faced tape is peeled. In that case, the double-faced tape of the front and back faces of the tip part sticks on the roll of the splitter, and interlayer peeling of the paper is performed.

In addition, the splitter is a device that rotates two contacting rolls manually. The surface electric resistivity is measured with a setting voltage of 100 V using 88340 ULTRA HIGH RESISTANCE METER (made by ADVANTEST).

The low electric-resistance region 12 may be provided so as to have the electric resistivity with the region (its perimeter) where the magnetic bodies 16 are present inside the paper body 10 when the paper body 10, the first paper layer 10A and the second paper layer 10B (that is, the region that does not have the conductive material 12A), and the low electric-resistance region 12 are not provided, specifically, may be provide so that, for example, the difference in electric resistivity from the paper body 10, the first paper layer 10A, and the second paper layer 10B (that is, the region that does not have the conductive material 12A) becomes from $0.5 \times 10^1 \Omega/\square$ to $1 \times 10^3 \Omega/\square$ (preferably from $0.5 \times 10^1 \Omega/\square$ to $0.5 \times 10^2 \Omega/\square$ and more preferably from $0.5 \times 10^1 \Omega/\square$ to $1 \times 10^2 \Omega/\square$) in terms of surface electric resistivity.

Particularly, the low electric-resistance region 12 may be provided so as to have the same electric resistivity as the electric resistivity of the region (its perimeter) where the magnetic bodies 16 are present when the low electric-resistance region 12 is not provided.

Thereby, poor transfer of an image by the electrophotographic image recording is easily suppressed.

The thickness of the low electric-resistance region 12 may be, for example, a thickness such that the magnetic bodies 16 do not stick out, specifically, may be, for example, from 15 mm to 80 mm, and is preferably from 15 mm to 60 mm.

The conductive material 12A will be described.

Examples of the conductive material include conductive (for example, a volume resistivity of less than $10^7 \Omega \cdot cm$; the same hereinbelow) materials or semi-conductive (for example, a volume resistivity of from $10^7 \Omega \cdot cm$ to $10^{11} \Omega \cdot cm$; the same hereinbelow) materials.

Specific examples of the conductive material 12A include carbon blacks (for example, ketjen black, acetylene black, carbon black whose surface is subjected to oxidation treatment, and the like), metals (for example, gold, silver, copper, aluminum, nickel, and the like), metal oxide compounds (for example, titanium oxide, zinc oxide, barium sulfate, aluminum borate, potassium titanate, tin oxide, yttrium oxide, tin oxide, and the like), ion conductivity substances (for example, potassium titanate, LiCl, and the like), conductive polymers (for example, polyaniline, polypyrrole, polysulfone, polyacethylene, and the like), and the like.

In addition, since the low electric-resistance region 12 may be colored in order to enhance the opacity of paper, a colored conductive material 12A may be used.

For examples of the conductive material 12A include carbon blacks, metals (for example, gold, silver, copper, and the like), and metal oxides (for example, titanium oxide, zinc oxide, barium sulfate, aluminum borate, potassium titanate, tin oxide, and the like).

Particularly, the conductive material 12A may have the same resistance value as or a difference within a range of $1\times10^5 \Omega \cdot cm$ or less from the resistance value (volume resistivity) of the magnetic bodies 16 from a viewpoint of realizing the low electric-resistance region 12 having the above property.

The conductive layer 14 will be described.

Examples of the conductive layer 14 include a conductive adhesive layer containing the conductive material 12A and an adhesive, and a conductive layer (for example, a metal, layer, a conductive resin layer, or the like) constituted by the conductive material 12A that is a simple substance. That is, the conductive layer 14 includes a layer in which the conductive layer 14 is dispersed and blended in an adhesive layer that bonds the first paper layer 10A and the second paper layer 10B.

Examples of the adhesive include well-known adhesives such as aqueous adhesives and solvent adhesives, specifically, starch, modified starch, EVA (polyvinyl alcohol), carboxymethylcellulose, urethane adhesives, polyester adhesives, epoxy adhesives, elastomeric adhesives, cyanoacrylate adhesives, and emulsion adhesives, and the like.

Others

The sheets of paper 101 and 102 related to the first and second exemplary embodiments may be subjected to a surface treatment with a surface sizing liquid, a surface treatment that provides a pigment coating layer, and a surface treatment that provides an antistatic layer or the like if needed.

Additionally, suitability for various applications may be added to the sheets of paper 101 and 102 related to the first and second exemplary embodiments by performing post-processing for adhesion, magnetism, flame resistance, heat resistance, water resistance, oil resistance, antislip or the like.

Production Method of Paper 101 Related to First Exemplary Embodiment

FIGS. 4A to 4D are process views showing a paper producing method related to the first exemplary embodiment.

Figure 4A:
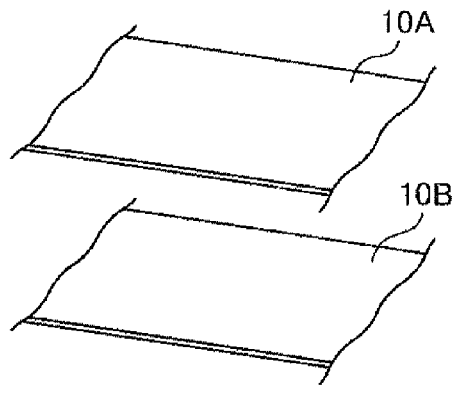
FIGS. 4A to 4D area process views showing a paper production method related to the first exemplary embodiment.

In the production method of the paper 101 related to the first exemplary embodiment, first, as shown in FIG. 4A, pulp fibers are sheeted to prepare the first paper layer 10A and the second paper layer 10B.

Specifically, for example, pulp fibers and if needed, pulp slurry containing an additive are sheeted, and is then dried to obtain roll-shaped or sheet-shaped paper sheets, and these paper sheets are prepared as the first paper layer 10A and the second paper layer 10B.

As the sheeting, for example, a well-known sheeting method using a long-net type, circular-net type, or twin-wire type sheeting machine are used.

Any of an acidic sheeting method and a neutral sheeting method may be used as the sheeting.

A well-known multilayer sheeting method may be used as the sheeting. As the multilayer sheeting method, for example, there is multilayer sheeting using a paper machine of a cylinder-net multi-cylinder type, a long-net multi-cylinder type, a combined long-net and circular-net type, a multi-headbox type, a short-net long-net type, or a round-net multi-cylinder type in which plural round nets are connected together.

Additionally, after the sheeting and drying, smoothing processing may be performed using a smoothing processing apparatus such as a super calender, a gloss calender, a soft calender, an on-machine, or an off-machine to obtain a roll-shaped or a sheet-shaped paper, and this paper may be prepared as the first paper layer 10A and the second paper layer 10B.

Figure 4B:
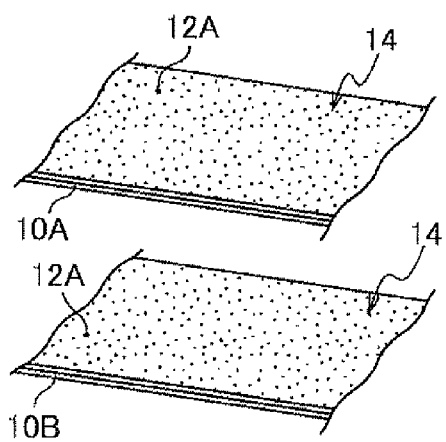

Next, as shown in FIG. 4B, the conductive layer 14 containing the conductive material 12A is formed one surface of each of both the first paper layer 10A and the second paper layer 10B.

Specifically, the conductive layer 14 is formed, for example, by preparing an application liquid containing the conductive material 12A and an adhesive, and applying the application liquid with a desired thickness to form a film. However, the conductive layer 14 in this stage is the conductive layer 14 (that is, conductive coating film) in an undried state or a non-cured state.

In addition, the aspect in which the conductive layer 14 is formed on one surface of each of both the first paper layer 10A and the second paper layer 10B has been described in the present exemplary embodiment. However, the invention is not limited to this, and the conductive layer 14 may be formed on one surface of at least one of the first paper layer 10A and the second paper layer 10B.

Figure 4C:
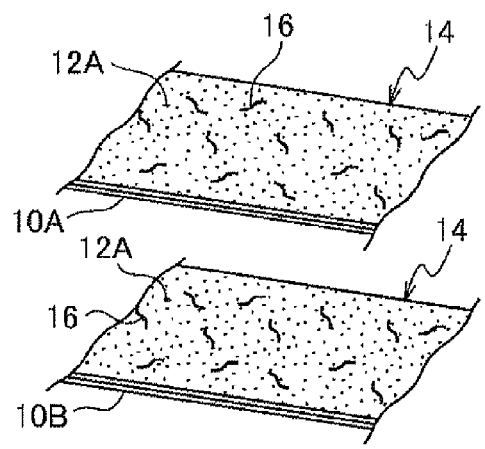

Next, as shown in FIG. 4C, the magnetic bodies 16 having a large Barkhausen effect are arranged on one surface in which the conductive layer 14 of each of the first paper layer 10A and the second paper layer 10B is formed.

Specifically, the magnetic bodies 16 are arranged on the formed conductive layer 14 by scattering pre-cut magnetic bodies 16 or continuously hanging down a non-cut linear magnetic body 16. In addition, when the non-cut magnetic body 16 is arranged, the magnetic body 16 is cut together during cutting of paper.

In addition, the aspect in which the magnetic bodies 16 are arranged on the conductive layer 14 formed on one surface of each of both the first paper layer 10A and the second paper layer 108 has been described in the present exemplary embodiment. However, when the conductive layer 14 is formed on one surface of one of the first paper layer 10A and the second paper layer 10B, the magnetic bodies 16 are arranged on one surface on which the conductive layer 14 is formed or on one surface on which the conductive layer is not formed, among surfaces of both the first paper layer 10A and the second paper layer 10B.

Figure 4D:
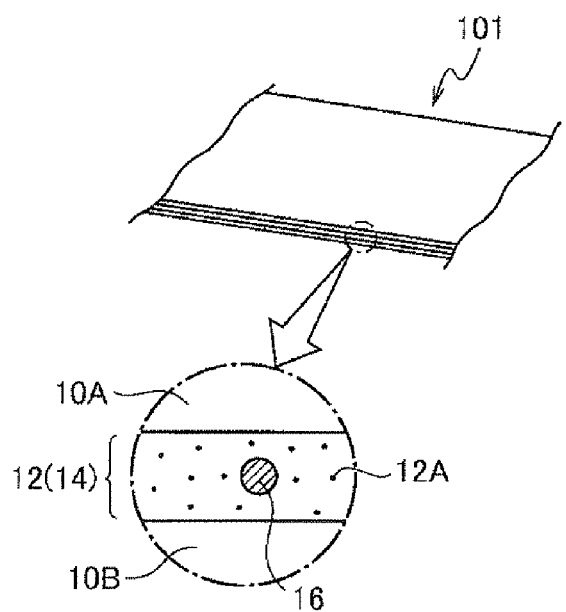

Next, as shown in FIG. 4D, the first paper layer 10A and the second paper layer 10B are pasted together so that the conductive layer 14 and the magnetic bodies 16 are interposed between mutual paper bodies.

The paper 101 related to the first exemplary embodiment is obtained through the above processes.

After that, the obtained paper 101 is subjected to, for example, various kinds of surface treatment or each post-processing or smoothing processing if needed.

Here, the production method of the paper 101 related to the first exemplary embodiment is not limited to the above production method, for example, a production method shown next may be used. This production method will be described below as the production method of the paper 101 related to another first exemplary embodiment.

Figure 5A:
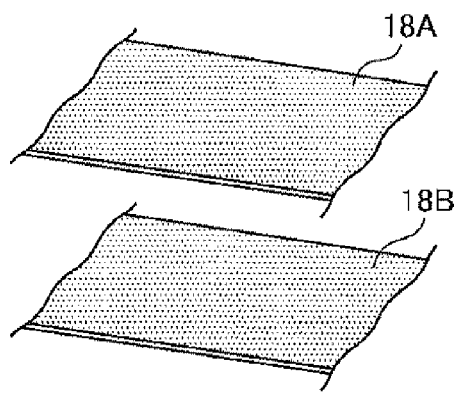
FIGS. 5A to 5D are process views showing a paper production method related to the second exemplary embodiment.

In the production method of the paper 101 related to the other first exemplary embodiment, as shown in FIG. 5A, pulp fibers are sheeted to prepare a first paper layer 18A and a second paper layer 18B in a wet state.

Specifically, for example, pulp fibers and if needed, pulp slurry containing an additive are sheeted to obtain paper sheets that do not undergo drying, and these paper sheets are prepared as the first base paper 18A and the second base paper layer 18B.

Figure 5C:
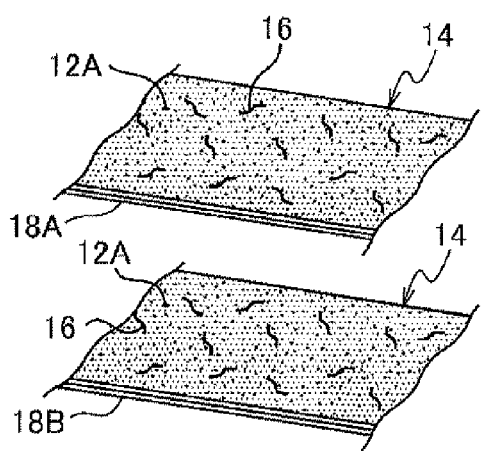
Figure 5B:
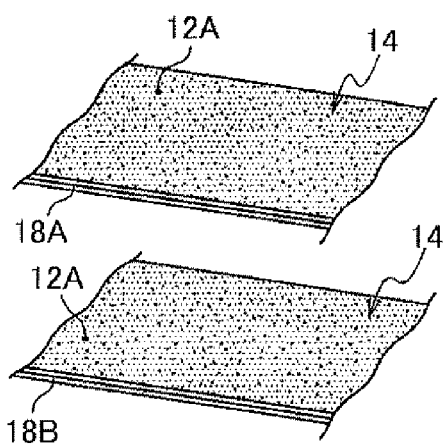

Next, as shown in FIG. 5B, the conductive layer 14 containing the conductive material 12A is scattered one surface of each of both the first base paper 18A and the second base paper 18B in a wet state.

Specifically, the conductive layer 14 is formed, for example, by preparing an application liquid containing the conductive material 12A and an adhesive, and applying the application liquid with a desired thickness to form a film. However, the conductive layer 14 in this stage is the conductive layer 14 (that is, conductive coating film) in an undried state or a non-cured state.

Additionally, for example, the conductive layer 14 constituted by a metal layer, a conductive resin layer, or the like is formed on one surface of each of both the first base paper 18A and the second base paper 18B in a wet state by scattering a liquefied or powdered conductive material 12A or applying an application liquid in which the conductive material 12A is dispersed or dissolved in a solvent.

In addition, the aspect in which the conductive layer 14 is formed on one surface of each of both the first base paper 18A and the second base paper 18B in a wet state has been described in the present exemplary embodiment. However, the invention is not limited to this, and the conductive layer 14 may be formed on one surface of at least one of the first base paper 18A and the second base paper 188 in a wet state.

Next, as shown in FIG. 5C, the magnetic bodies 16 having a large Barkhausen effect are arranged on one surface in which the conductive layer 14 of each of the first base paper 18A and the second base paper 18B in a wet state is formed.

Specifically, for example, the magnetic bodies 16 are arranged on the formed conductive layer 14 by scattering pre-cut magnetic bodies 16 or continuously hanging down a non-cut linear magnetic body 16. In addition, when the non-cut magnetic body 16 is arranged, the magnetic body 16 is cut together during cutting of paper.

In addition, the aspect in which the magnetic bodies 16 are arranged on one surface on which the conductive layer 14 of each of the first base paper 18A and the second base paper 18B in a wet state is formed has been described in the present exemplary embodiment. However, when the conductive layer 14 is formed on one surface of one of the first base paper 18A and the second base paper 18B in a wet state, the magnetic bodies 16 may be arranged on one surface on which the conductive layer 14 is formed or on one surface on which the conductive layer is not formed, among surfaces of the first base paper 18A and the second base paper 18B in a wet state.

Figure 5D:
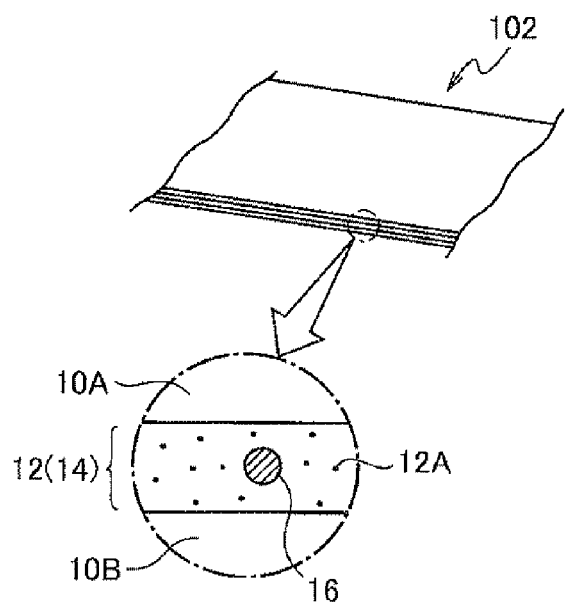

Next, as shown in FIG. 5D, the first base paper 18A and the second base paper 18B in a wet state are pasted together and then dried so that the conductive layer 14 and the magnetic bodies 16 are interposed between mutual base paper sheets.

The paper 101 related to the first exemplary embodiment is obtained through the above processes.

Production Method of Paper 102 Related to Second Exemplary Embodiment

FIGS. 6A to 6E are process views showing a production method of paper 102 related to the second exemplary embodiment.

In the production method of the paper 102 related to the second exemplary embodiment, first, as shown in FIGS. 4A to 4D, the first paper layer 10A and the second paper layer 10B that are pasted together so that the conductive layer 14 and the magnetic bodies 16 are interposed between mutual paper bodies are obtained.

Figure 6A:
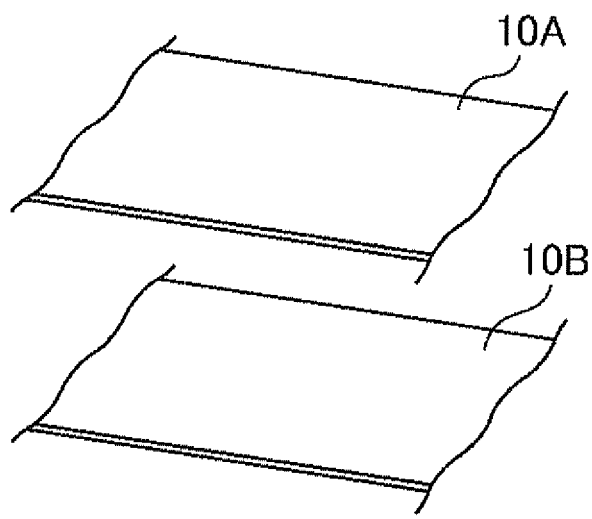
FIGS. 6A to 6E are process views showing a paper production method related to another second exemplary embodiment.
Figure 6B:
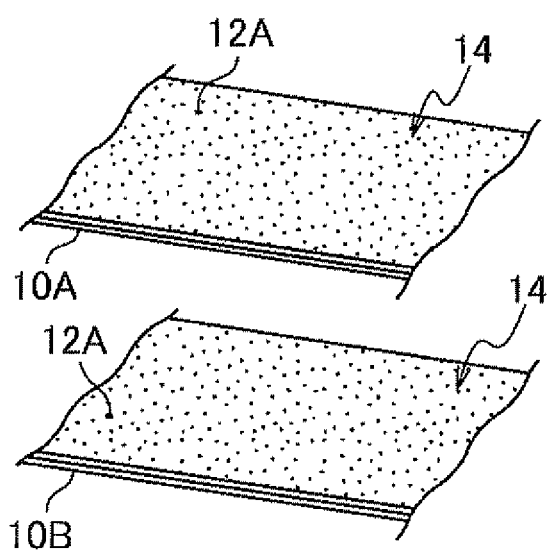
Figure 6C:
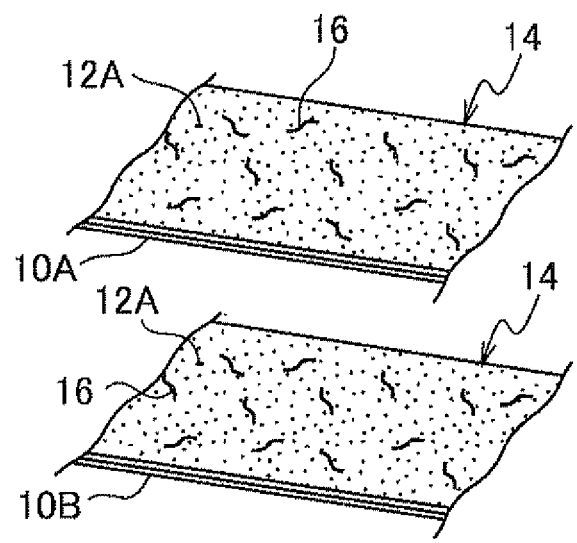
Figure 6D:
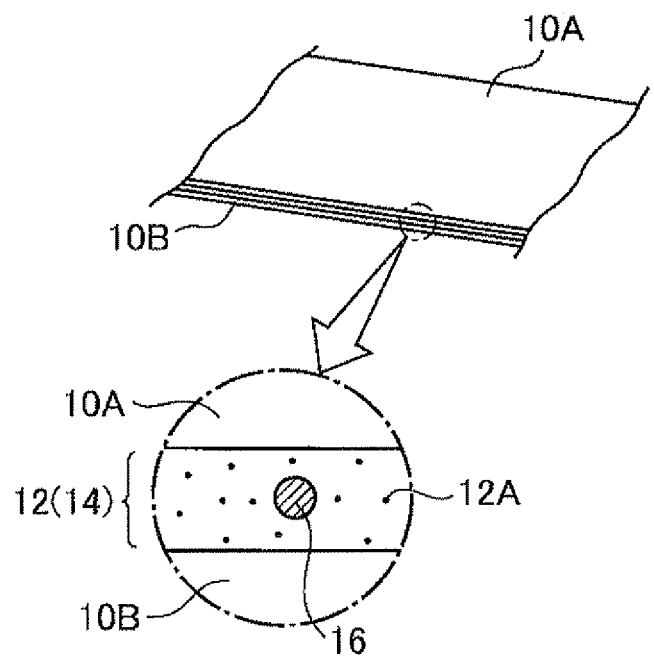
Figure 6E:
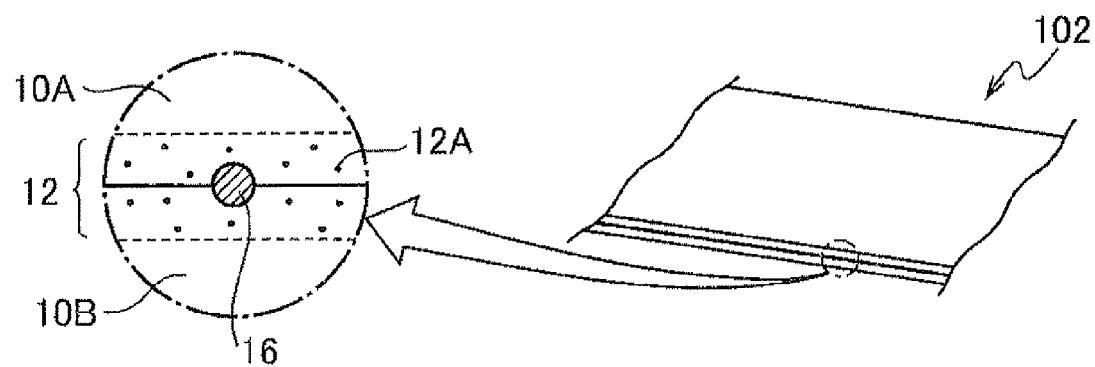

Then, during this pasting, as shown in FIG. 6E, the processing of compressing the first paper layer 10A and the second paper layer 1013 in the thickness direction is performed, and the insides of the first paper layer 10A and the second paper layer 10B are impregnated with the components of the conductive layer 14.

The compression processing is performed, for example, by passing the pasted first paper layer 10A and second paper layer 10B between a pair of rolls whose pressure is adjusted.

Through the compression processing, the first paper layer 10A and the second paper layer 10B are brought into close contact with each other, the insides of the first paper layer 10A and the second paper layer 10B are impregnated with the components of the conductive layer 14, the conductive material 12A contained in the conductive layer 14 also shifts to the first paper layer 10A and the second paper layer 10B, the region (that is, the low electric-resistance region 12) where the conductive material 12A is dispersed is formed between the unified first paper layer 10A and the second paper layer 10B, and the magnetic bodies 16 are arranged inside the region (low electric-resistance region 12).

The paper 102 related to the second exemplary embodiment is obtained through the above processes.

After that, the obtained paper 102 is subjected to, for example, various kinds of surface treatment or each post-processing or smoothing processing if needed.

Additionally, the compression processing may be performed, for example, by adjusting the pressure to be given by a processing apparatus during this processing.

Here, the production method of the paper 102 related to the second exemplary embodiment may also be produced using the first base paper 18A and the second base paper 18B in a wet state instead of the first paper layer 10A and the second paper layer 10B, similarly to the production method of the paper 101 related to the other first exemplary embodiment.

EXAMPLES

The invention will be more specifically described below by taking examples. However, these respective examples do not limit the invention.

Example 1

A pulp slurry is obtained by adding 0.15 parts by weight of a cationized starch (trade name: MS4600 made by Nihon Shokuhin Kagaku Kogyo Co., Ltd.), 0.1 part by weight of an alkenylsuccinic anhydride (Fiblan 81 made by National Starch & Chemical Japan Co., Ltd.), and 1.0 part by weight of sodium sulfate (made by Takasugi Pharmaceutical Co, Ltd.) with respect to 100 parts by weight of the pulp fiber solid matter, into a pulp slurry containing 90 parts by weight of hardwood bleached kraft pulps (LBKP) and 10 parts by weight of softwood bleached kraft pulps (NBKP).

A hand-made sheet is produced using the obtained pulp slurry (solid matter concentration: 1.0% by weight) by a round sheet machine (made by Kumagai Riki Kogyo Co., Ltd.).

The produced hand-made sheet is pressed for 1 minute at a pressure of 10 kgf/cm$^2$ with a square sheet machine press (made by Kumagai Riki Kogyo Co., Ltd.) and then dried at a heating temperature of 100° C., and a rotational speed of 100 cm/min by a KRK rotary dryer (made by Kumagai Riki Kogyo Co., Ltd.), whereby a paper layer with a basis weight of 86 g/m$^2$ is obtained.

A conductive layer (conductive adhesive layer) is formed by preparing the obtained paper layers as many as two, and applying an adhesive [adhesive obtained by dispersing and blending 30 parts by weight of a conductive material (W-10 (titanium oxide: made by Ishihara Sangyo Kaisha, Ltd.) in 70 parts by weight of an adhesive (Ace-Tac made from Keiwa, Inc.)] in which a conductive material is blended, to one surface of each paper body so as to have a thickness of 10 μm.

Then, the magnetic bodies [those obtained by cutting a magnetic body wire (principal components: Co and Ni, external diameter: 50 μm, and internal diameter: 30 μm) coated with glass by the Taylor-Ulitovsky Method into a length of 40 mm] are arranged as many as five on the conductive layer (conductive adhesive layer) of one surface of each of the two paper layers.

Next, the two paper layers are pasted and bonded together so that the conductive layer and the magnetic bodies are interposed between the paper layers.

The paper of Example 1 is obtained in this way.

Example 2

In Example 1, when the two paper layers are pasted together so that the conductive layer and the magnetic bodies are interposed between the paper layers, the paper layers are pressed for 10 minutes at a pressure of 10 kgf/cm$^2$ by a square paper machine press (made by Kumagai Riki Kogyo Co., Ltd.) and are brought into close contact with each other to impregnate each paper layer with the components of the conductive layer (conductive adhesive layer).

The paper of Example 2 is obtained in this way.

Example 3

A pulp slurry is obtained by adding 0.15 parts by weight of a cationized starch (trade name: MS4600 made by Nihon Shokuhin Kagaku Kogyo Co., Ltd.), 0.1 part by weight of an alkenylsuccinic anhydride (Fiblan 81 made by National Starch & Chemical Japan Co., Ltd.), and 1.0 part by weight of sodium sulfate (made by Takasugi Pharmaceutical Co, Ltd.) with respect to 100 parts by weight of the pulp fiber solid matter, into a pulp slurry containing 90 parts by weight of hardwood bleached kraft pulps (LBKP) and 10 parts by weight of softwood bleached kraft pulps (NBKP).

A hand-made sheet is produced using the obtained pulp slurry (solid matter concentration: 1.0% by weight) by a round sheet machine (made by Kumagai Riki Kogyo Co., Ltd.). In order to remove the moisture of the produced hand-made sheet to some extent, the hand-made sheet is sandwiched between sheets of filter paper and is pressed for 3 minutes at a pressure of 10 kgf/cm$^2$ by a square sheet machine press (made by Kumagai Riki Kogyo Co., Ltd.).

The hand-made sheet in a wet state after this pressing is used as a base paper (base paper in a wet state), these types of sheets are prepared as many as two, and a solution in which a conductive material (W-10 (titanium oxide: Ishihara Sangyo Kaisha Ltd.)) is dispersed in a dispersion medium (3% by weight of an oxidized starch solution (Oxidized Starch Ace A: made by Oji Cornstarch Co., Ltd.)) is applied to one surface of each of the sheets to scatter the conductive material so as to have 2.6 g/m2.

Then, the magnetic bodies [those obtained by cutting a magnetic body wire (principal components: Co and Ni, external diameter: 50 μm, and internal diameter: 30 μm) coated with glass by the Taylor-Ulitovsky Method into a length of 40 mm] are arranged as many as five on the conductive layer of the base paper (base paper in a wet, state).

Next, the base papers (base papers in a wet state) pasted together so as to be the conductive material and the magnetic bodies are interposed between the base papers.

Then, the pasted base papers are pressed for 1 minute at a pressure of 10 kgf/cm$^2$ with a square sheet machine press (made by Kumagai Riki Kogyo Co., Ltd.) and then dried at a heating temperature of 100° C., and a rotational speed of 100 cm/min by a KRK rotary dryer (made by Kumagai Riki Kogyo Co., Ltd.), whereby a paper body with a basis weight of 86 g/m$^2$ is obtained.

The paper of Example 3 is obtained in this way.

Comparative Example 1

The paper of Comparative Example 1 is obtained similarly to Example 1 except that the conductive material is not blended in a used adhesive.

EVALUATION

The following evaluation is performed using the papers obtained in the respective examples.

Resistivity

In the papers obtained in the respective example, the surface electric resistivity of the region (low electric-resistance region) where the conductive material is blended, and the region (paper body) where the conductive material is not blended are investigated.

The surface electric resistivities of the respective regions are investigated as follows.

Interlayer peeling of a sheet of paper is performed by a splitter, and the surface electric resistivity of the low electric-resistance region and the paper body (or the paper layer) that are interlayer-peeling faces is measured. A paper interlayer-peeling method in the splitter passes the splitter so that a short side on which a double-faced tape is stuck becomes a tip after the double-faced tape is stuck on the front and back faces of a tip part of one short side of a sheet of paper of 15×20 cm and a separate paper of the double-faced tape is peeled. In that case, the double-faced tape of the front and back faces of the tip part sticks on the roll of the splitter, and interlayer peeling of the paper is performed.

In addition, the splitter is a device that rotates two contacting rolls manually. The surface electric resistivity is measured with a setting voltage of 100 V using an R8340 ULTRA HIGH RESISTANCE METER (made by ADVANTEST).

Poor Transfer

Images (monochromatic black half-tone images (image density: 50%)) are formed on the papers obtained in the respective examples, using "Apeos Port C4300" made by Fuji Xerox Co., Ltd., and poor transfer is evaluated. The evaluation criteria are as follows.

Evaluation Criteria

A: Poor transfer is not visually recognized

B: Level with no problem in use although it is visually recognized that the black of a magnetic body blended portion is thin C: Level with problem in use that is visually recognized that the black of a magnetic body blended portion is thin D: Visually recognized that a magnetic body blended portion becomes white due to poor transfer.

TABLE 1

|  | Example 1 | Example 2 | Example 3 | Comparative Example 1 |
|---|---|---|---|---|
| Region Where Conductive Material Is Blended (Low Electric-Resistance Region) Surface Electric Resistivity Ω/□ | $1.25 \times 10^7$ | $1.54 \times 10^7$ | $3.17 \times 10^8$ | $2.85 \times 10^{10}$ |

TABLE 1-continued

|  | Example 1 | Example 2 | Example 3 | Comparative Example 1 |
|---|---|---|---|---|
| Region Where Conductive Material Is Not Blended (Paper Body Or Paper Layer) Surface Electric Resistivity Ω/□ | $4.54 \times 10^{10}$ | $8.28 \times 10^{9}$ | $2.26 \times 10^{10}$ | $2.49 \times 10^{10}$ |
| Evaluation of Poor Transfer | B | A | B | D |

It can be understood from the above results that excellent results are obtained in the present examples in terms of poor transfer compared with the comparative example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A paper comprising:
a paper body containing pulp fibers;
a low electric-resistance region provided in a layer inside the paper body and being lower than the paper body in electric resistivity, the low electric-resistance region comprising a film layer having a plurality of conductive material elements dispersed within the film layer; and
magnetic bodies arranged inside the film layer of the low electric-resistance region and having a large Barkhausen effect, the magnetic bodies being separately dispersed from the conductive material elements within the film layer.

2. The paper according to claim 1, comprising:
a first paper layer containing pulp fibers; and
a second paper layer containing pulp fibers,
wherein the low electric-resistance region is provided so as to be interposed between the first paper layer and the second paper layer and is constituted by a conductive layer containing a conductive material.

3. The paper according to claim 1,
wherein the low electric-resistance region is constituted by a region where a conductive material is dispersed inside the paper body.

4. A paper production method comprising:
sheeting pulp fibers to prepare a first paper layer and a second paper layer;
forming low electric-resistance film layer containing a plurality of dispersed conductive material elements on a first surface of at least one of the first paper layer and the second paper layer;
arranging magnetic bodies having a large Barkhausen effect on the surface on which the conductive layer is formed or on a second surface on which the conductive layer is not formed, among surfaces of the first paper layer and the second paper layer; and
pasting together the first paper layer and the second paper layer so that the conductive layer and the magnetic bodies are interposed between paper bodies, the magnetic bodies being separately dispersed from the conductive material elements within the low electric-resistance film layer.

5. The paper production method according to claim 4,
wherein when the pasting is performed, the processing of compressing the first paper layer and the second paper layer in a thickness direction is performed, and the insides of the first paper layer and the second paper layer are impregnated with components of the conductive layer.

6. A paper production method comprising:
sheeting pulp fibers to prepare a first base paper and a second base paper in a wet state;
forming a low electric-resistance film layer containing a plurality of dispersed conductive material elements on a first surface of at least one of the first base paper and the second base paper in a wet state;
arranging magnetic bodies having a large Barkhausen effect on the first surface on which the conductive layer is formed or on a second surface on which the conductive layer is not formed, among surfaces of the first base paper and the second base paper in a wet state;
pasting together the first base paper and the second base paper in a wet state so that the conductive layer and the magnetic bodies are interposed between paper bodies, the magnetic bodies being separately dispersed from the conductive material elements within the low electric-resistance film layer;
drying the pasted first base paper and second base paper in a wet state.

* * * * *